United States Patent
Yamagata et al.

(10) Patent No.: US 6,655,730 B2
(45) Date of Patent: Dec. 2, 2003

(54) AUTOMOBILE INTERIOR HEADLINER MOLDING OR FORMING MEMBER AND AN AUTOMOBILE INTERIOR HEADLINER MEMBER USING THE SAME

(75) Inventors: Shigeru Yamagata, Tokyo (JP); Ryoetsu Sakurabashi, Tochigi-ken (JP); Hisanori Yagi, Tokyo (JP); Mitsutoshi Ogata, Tochigi-ken (JP); Akihiko Kojima, Chiba-ken (JP)

(73) Assignee: Oji Paper Co., Ltd., Tokyo (JP)

( * ) Notice: Subject to any disclaimer, the term of this patent is extended or adjusted under 35 U.S.C. 154(b) by 0 days.

(21) Appl. No.: 09/828,958

(22) Filed: Apr. 10, 2001

(65) Prior Publication Data

US 2002/0127388 A2 Sep. 12, 2002

(30) Foreign Application Priority Data

Apr. 24, 2000 (JP) ......................... 2000-122175
Dec. 19, 2000 (JP) ......................... 2000-385429

(51) Int. Cl.$^7$ ................ B60J 7/00; B23B 3/26; B23B 27/08; B23B 29/00; B23B 27/00
(52) U.S. Cl. ................. 296/214; 428/220; 428/304.4; 428/318.6; 428/319.3; 428/319.7; 428/324; 428/332; 428/515; 428/537.5
(58) Field of Search ................ 428/31, 215, 220, 428/304.4, 318.4, 318.6, 319.3, 319.7, 323, 324, 332, 337, 339, 411.1, 500, 515, 537.5, 319.9, 403, 405; 296/214

(56) References Cited

U.S. PATENT DOCUMENTS

| | | | |
|---|---|---|---|
| 4,128,683 A | 12/1978 | Nomura et al. | 428/138 |
| 4,330,584 A | 5/1982 | Doerer | 428/91 |
| 5,075,162 A | 12/1991 | Okubo et al. | 428/304.4 |
| 5,891,946 A | 4/1999 | Nohara et al. | |
| 5,916,672 A * | 6/1999 | Reeves et al. | 428/319.9 |
| 5,965,251 A * | 10/1999 | Namura et al. | 428/318.4 |
| 6,129,378 A | 10/2000 | Goto et al. | 280/732 |
| 6,203,893 B1 | 3/2001 | Nohara et al. | |
| 6,444,073 B1 * | 9/2002 | Reeves et al. | 156/211 |

FOREIGN PATENT DOCUMENTS

| | | |
|---|---|---|
| EP | 708146 | 4/1996 |
| JP | 2-58100 | 12/1990 |
| WO | 99/61283 | 12/1999 |

OTHER PUBLICATIONS

English Languge Abstract of DE 43 206 36.
English Language Abstract of DE 195 44 451.

* cited by examiner

Primary Examiner—Paul Thibodeau
Assistant Examiner—Sheeba Ahmed
(74) Attorney, Agent, or Firm—Greenblum & Bernstein, P.L.C.

(57) ABSTRACT

The problem to be solved is to provide an automobile interior headliner member which is improved in the film forming property of a complex plastic material used as a base material of the automobile interior headliner member, and has high rigidity and excellent heat resistance, size stability and working efficiency upon attachment; and the base material. An automobile interior headliner molding or forming member which is obtained by kneading mica having a particle size of 10 to 100 $\mu$m with a polypropylene resin having a melt flow rate at 230° C. of 3 to 40 g/10 min to obtain the corresponding resin having a mica content of 15 to 40 wt. %, molding or forming the resin into a mica-containing polypropylene sheet of 100 to 300 $\mu$m thick and then stacking this sheet over each of both sides of an expanded polypropylene sheet of 2 to 6 mm thick obtained at an expansion ratio of 5 to 50 times; and an automobile interior headliner member molded or formed from the molding or forming member.

23 Claims, 3 Drawing Sheets

AUTOMOBILE INTERIOR HEADLINER MOLDING OR FORMING MEMBER AND AN AUTOMOBILE INTERIOR HEADLINER MEMBER USING THE SAME

BACKGROUND OF THE INVENTION

1. Field of the Invention

The present invention relates to an automobile interior headliner member which is a headliner material of an automobile and an automobile interior headliner molding or forming member to be used for the molding or forming of the headliner member and also to a laminate to be molded or formed to conform to a flat or curved shape.

2. Description of the Related Art

As a base material conventionally employed for an interior headliner material of an automobile, known are that obtained by adding specific thermosetting fibers to split natural fibers or synthetic fibers to form a predetermined fiber mixture and then applying a uniform pressure to the mixture to impart it with a curved face; that obtained by sandwiching a paper corrugated sheet between hot presses, thereby forming it to have a curved face; that obtained by kneading talc or glass fibers in a polypropylene sheet; and a plastic sheet member obtained by adhering a styrene film to an expanded polystyrene, sheet.

The molding or forming members obtained from such combinations involve a problem in molding or forming efficiency or cost, or molded or formed products of them have both merits and demerits in heat resistance, moisture resistance and size stability of the product. Particularly, those obtained by kneading glass fibers in a polypropylene sheet are excellent in the post-molding or -forming properties such as heat resistance, moisture resistance and size stability, but a marked improvement in the working environment in their production step is required or their disposal method is limited, for example, they must be reclaimed even if incinerated after use owing, to the glass fibers mixed therein.

Injection molded products obtained by mixing an inorganic material such as mica or talc in a polypropylene resin in order to improve their rigidity and heat resistance are well known as industrial materials used for automobiles or light electric appliances Injection molded products are however not preferred for their heaviness. A technique of combining an extruded plastic sheet and expanded. polypropylene is known as that for imparting an interior headliner molding or forming member with the advantage of mica and at the same time, for decreasing its weight. When the mica-containing layer is a single layer, however, the rigidity is not improved sufficiently. In addition, a propylene-mica kneaded resin is accompanied with the problem in an extrusion film-forming property, more specifically, the property to form a wide sheet as thin as 300 $\mu$m or less, which is the target thickness of the present inventor.

As described above, a molding or forming material which uses, for weight reduction, expanded polypropylene as a base and a mica-containing polypropylene sheet in combination is recognized to have improved rigidity and heat resistance, but it is also necessary to further improve the size stability and decrease sagging at high temperatures to satisfy the demand for an improvement in the size accuracy of an interior headliner material.

SUMMARY OF THE INVENTION

Accordingly, an object of the present invention is to provide a complex material having a new constitution obtained by kneading a polypropylene resin and mica, molding or forming kneaded mass into a thin sheet, and then stacking the thin sheet over an expanded polypropylene sheet; and moreover to provide an automobile interior headliner molding or forming member which is improved in the film-forming property of the resin into the mica-containing polypropylene sheet even if the sheet is wide and thin, has high rigidity, is good in working properties upon attachment, has excellent formability upon pressing, is equipped with post-molding or-forming properties such as heat resistance, moisture resistance and size stability, and permits a weight reduction.

With a view to overcoming the above-described problems, the below-described aspects are embraced in the present invention.

In a first aspect of the present invention, there is thus provided an automobile interior headliner molding or forming member (a member used for molding or forming an automobile interior headliner member) comprising a three-layer complex plastic sheet material having formed of an expanded polypropylene sheet and mica-containing polypropylene sheets stacked on both sides thereof, wherein the three-layer complex plastic sheet material is obtained by kneading mica having a particle size of 10 to 100 $\mu$m and a polypropylene resin having a melt flow rate (in accordance with Method B of JIS-K-7210) of 3 to 40 g/10 min as measured at a testing temperature of 230 ° C. under a test load of 21.18 N, forming the resulting mica-containing resin having a mica content of 15 to 40 wt. % into a mica-containing polypropylene sheet having a thickness of 100 to 300 $\mu$m and then stacking the mica-containing polypropylene sheet over each of the both sides of the expanded polypropylene sheet having an expansion ratio of 5 to 50 times and a thickness of 2 to 6 mm.

The present invention has thus actualized an automobile interior headliner molding or forming member which is light in weight and excellent in rigidity by employing a three-layer complex plastic sheet material comprising an expanded polypropylene sheet and a mica-containing polypropylene sheet stacked over both sides thereof.

As the expanded polypropylene sheet to be used in the present invention, an atmospherically expanded and crosslinked polypropylene sheet is suited.

In a second aspect of the present invention, there is also provided an automobile interior headliner molding or forming member according to the first aspect of the present invention, wherein on the surface of the mica-containing polypropylene sheet constituting the surface side of the three-layer complex plastic sheet material, that is, the indoor side of the automobile headliner, a reinforcing portion has been partially formed using the mica-containing polypropylene sheet.

In a third aspect of the present invention, there is also provided an automobile interior headliner molding or forming member according to the second aspect of the present invention, wherein the reinforcing portion has been formed by partially adhering, to the surface of the mica-containing, polypropylene sheet (indoor side of the automobile headliner material) constituting the three-layer complex plastic sheet material, another mica-containing polypropylene sheet similar in material quality to said mica-containing polypropylene sheet.

In this third aspect of the invention; the another mica-containing polypropylene sheet partially adhered to the surface side (indoor side) preferably has the same material quality with that of the mica-containing polypropylene sheet which constitutes the surface side of the three-layer complex plastic sheet material, but these polypropylene sheets may be a little different in material quality within an extent of the first aspect of the present invention.

In this third aspect of the present invention, in the stage prior to press forming, the another mica-containing polypropylene sheet to be partially adhered to the surface side (indoor side) may only temporarily be adhered to the surface-side-constituting mica-containing polypropylene sheet of the three-layer complex plastic sheet material. This portion is molten and then adhered by heat when the automobile interior headliner member is formed by press forming under heat.

In this third aspect of the present invention, the mica-containing polypropylene sheet on the surface side (indoor side of the automobile headliner material) becomes partially thick, which however does not cause any problem in appearance because the step difference at the boundary between thin and thick portions disappears by press forming into the automobile interior headliner member under heat.

In a fourth aspect of the present invention, there is also provided an automobile interior headliner molding or forming member according to the second aspect of the present invention, wherein upon extruding the mica-containing polypropylene sheet constituting the surface side of the three-layer complex plastic sheet material, that is, the indoor side of the automobile headliner material, and then stacking the extruded sheet on the expanded polypropylene sheet, said reinforcing portion has been formed thick on the surface side of the mica-containing polypropylene sheet by changing the lip clearance of the discharge portion of the extruder in order to thicken a site which requires sufficient strength, thereby increasing the strength threat.

Also in this fourth aspect of the present invention, the mica-containing polypropylene sheet on the surface side (indoor side of the automobile headliner member) becomes partially thick, but it does not cause any problem in appearance because a change in the lip clearance can be carried out smoothly and the step difference at the boundary between the thick and thin portions can be eliminated by heating and pressurization upon press forming of an automobile interior headliner member.

In a fifth aspect of the present invention, there is also provided an automobile interior headliner molding or forming member according to any one of the second to fourth aspects of the present invention, wherein the reinforcing portion of the mica-containing polypropylene sheet constituting the surface side of the three-layer complex plastic sheet material, that is, the indoor side of the automobile headliner, is disposed along the outer edge (meaning a region having a predetermined width a long the outer edge) and/or along the central portion (meaning a region having a predetermined width along the center) of the complex material.

In this invention, it is possible to thicken either one of the slender central region along the extruding direction of the resin of the three-layer complex plastic sheet material or slender regions on the both sides along the extruding direction of the resin. Or, both may be thickened. Alternatively, a slender central region along a direction vertical to the extruding direction of the resin or slender regions on both sides along a direction vertical to the extruding direction of the resin may be thickened. Or, both may be thickened.

In a sixth aspect of the present invention, there is also provided an automobile interior headliner molding or forming member according to any one of the first to fifth aspects of the present invention, wherein a back treating material has been adhered to the back side of the complex plastic sheet material having a three-layer structure. The term "back treating material" as used herein means a material to be adhered for preventing frictional noises caused by oscillation during automobile traveling.

In a seventh aspect of the present invention, there is also provided an automobile interior headliner member obtained by molding or forming an automobile interior headliner molding or forming member according to any one of the first to six aspects of the invention, wherein the mica-containing polypropylene sheet constituting the back side (a side opposite to the indoor side of the automobile headliner) of the three-layer complex plastic sheet material partially has a ruggedness and the mica-containing polypropylene sheet (the indoor side of the automobile headliner) has a substantially flat surface without ruggedness.

In an eighth aspect of the present invention, there is also provided an automobile interior headliner member formed using an automobile interior headliner molding or forming member according to anyone of the first to the sixth aspects of the present invention, which has further a layer of a resin laminate paper outside the mica-containing polypropylene sheet constituting the back side of the three-layer complex plastic sheet material.

The above-described layer of a resin laminate paper may be disposed by directly adhering it to the backside of the three-layer complex plastic sheet material or by forming another layer such as a layer of a back treating material on the back side of the three-layer complex plastic sheet material and then adhering outside thereof the resin laminate paper.

In a ninth aspect of the present invention, there is also provided an automobile interior headliner molding, or forming member according to any one of the first to sixth aspects of the present invention, which has a maximum flexural load at break of 9.8 to 49.0 N as measured at a bending test by applying, at a rate of 50 mm/min, a load to a test piece of 50 mm×150 mm at the center of 100 mm span length supported freely at both ends until the member is broken.

The maximum flexural load of 9.8 to 49.0 N is a value which an automobile interior headliner member is essentially required to have. This value can also be applied to an automobile interior headliner molding or forming member when it is not subjected to special processing for imparting it with strength upon molding or forming of an automobile interior headliner molding or forming member prior to molding or forming into a headliner member.

In a tenth aspect of the present invention, there is also provided an automobile interior headliner member according to the seventh or eighth aspect of the present invention, wherein the maximum flexural load at break is 9.8 to 49.0N as measured at a bending test by applying, at a rate of 50 mm/min, a load to a test piece of 50 mm×150 mm at the center of 100 mm span length supported freely at both ends until the member is broken.

DESCRIPTION OF THE PREFERRED EMBODIMENTS

The present inventors studied appropriate conditions for mica and a polypropylene resin which permit extrusion of a mica-containing polypropylene resin—which has ordinarily given actual results as a resin for injection molding—into a thin sheet of 100 to 300 μm thick at the width of a T die (a discharging portion of an extruder) as wide as about 1,500 mm and take-off speed of 10 to 30 m/min on a mass production base.

The kind, particle size and content of mica, melt flow rate (MFR) of a polypropylene resin, a coupling agent and its content, and extruding conditions from a T die were studied but at first, it was utterly impossible to form such a thin sheet at the T die width and take-off speed as described above. The present inventors however proceeded with investigation and finally, succeeded in finding appropriate conditions.

As mica, preferred are muscovite, sericite and phlogopite. When the mica having an aspect ratio of 5 or greater is contained in an amount of 15 to 40 wt. %, it is preferred to have a particle size of 10 to 100 μm. The particle size does not necessarily fall within the above-described range when the mica is used for a laboratory test or such a purpose, insofar as the T die width is 500 mm or less, take-off speed is less than 10 m/min and sheet thickness of 500 μm. When the particle size is less than 10 μm under the above-described conditions for mass production (conditions permitting extrusion into a thin sheet of 100 to 300 μm thickness at the T die width as wide as about 1500 mm and take-off speed of 10 to 30 m/min), a film can be formed favorably, but the rigidity of the resulting film is inferior. Particle sizes exceeding 100 μm are on the other hand inappropriate because the film formed therefrom may be pierced with holes. The particle size more preferred is 15 to 50 μm from the viewpoints of rigidity and film formation.

With regards to the content of mica, rigidity of the resulting film is poor at a content less than 15 wt. %, while holes tend to be made frequently at a content exceeding 40 wt. %. From the viewpoint of preventing holes, the preferred mica content falls within a range of 15 to 30 wt. %.

The mica is preferred to have an aspect ratio (obtained by dividing diameter by thickness) of 5 or greater, with 10 or greater being particularly preferred. Mica having an aspect ratio less than 5 is inferior in rigidity improving effects, because it cannot be oriented in parallel to a molding member sheet. A sheet available from a mica having a higher aspect ratio is presumed to exhibit greater rigidity owing to an increase in the number of mica layers in the molding member sheet.

A polypropylene resin to be a base for kneading with mica is preferred to have a melt flow rate (in accordance with Method B of JIS-K-7210) of 3 to 40 g/10 minutes at test temperature of 230° C. and test load of 21.18 N under the above-described mass producing conditions (conditions for extruding into a sheet having a film thickness as thin as 100 to 300 μm at a T die width as wide as about 1500 mm and take-off speed of 10 to 30 m/minutes) when the mica has an aspect ratio of 5 or greater, particle size of 10 to 100 μm and content of 15 to 40 wt. %. At such a comparatively high melt flow rate, the resin kneaded with mica exhibits good spread ability upon extrusion, making it possible to form a sheet free of holes and having good appearance. Melt flow rates less than 3 g/10 minutes are not preferred because a sheet thus obtained tends to be pierced with holes due to poor spread ability. Melt flow rates exceeding 40 g/10 minutes on the other hand are not preferred because the resin becomes excessively soft.

The rigidity of the sheet can be heightened by improving the adhesion on the interface between the polypropylene resin and mica. Since rigidity depends on the adhesion on the interface as described above, sheet formation after addition of a coupling agent acting on the interface as needed is therefore preferred. Treatment of mica with a silane coupling agent is preferred. This treatment heightens hydrophobic nature on the surface of mica, thereby improving the adhesion with the polypropylene resin, resulting in the formation of a film having high rigidity. The content of the coupling agent is preferably 0.1 to 5 wt. %.

Use of the materials as defined above is appropriate for obtaining a thin mica-containing polypropylene sheet through extrusion from a T die.

The expanded polypropylene sheet to be combined as a complex material with the mica-containing polypropylene sheet is preferably an atmospherically expanded and crosslinked polyprbpylene sheet produced by atmospheric crosslinking and expansion. Such crosslinking brings about good size stability upon forming into an automobile headliner material by heating and pressurization. The atmospheric crosslinking expansion is a method to obtain an expanded body by blending a resin and a thermally decomposed type foaming agent with a crosslinking agent or crosslinking assistant, extruding the mixture into an expandable sheet and then crosslinking and foaming it by exposure to electron beams; or a method of extruding the mixture, and carrying out crosslinking and expansion (chemical crosslinking method).

When the expansion ratio does not exceed several times or the like, the sheet has rigidity. When the expansion ratio increases to several tens times, on the other hand, the sheet exhibits properties as a soft and flexible film. In the present invention, the expansion ratio and thickness are set at 5 to 50 times and 2 to 6 mm, respectively in order to satisfy both the rigidity and weight reduction.

The structure of a laminate is determined as usual by the rigidity, stretch ability and light weight which the laminate structure is required to have. In the present invention, an automobile interior headliner molding or forming member obtained using an expanded polypropylene sheet having 2 to 6 mm thickness is, supposed as an example. It basically has a three layer structure with an expanded polypropylene sheet inserted therein, more specifically, it has a mica-containing polypropylene sheet/expanded polypropylene sheet/mica-containing polypropylene sheet structure. A material having this three layer structure is described herein as a"three-layer complex plastic sheet material" or simply as "three-layer complex plastic material". It may be considered as a multi-layer laminate for molding or forming which is, for example, composed of mica-containing polypropylene sheet/ expanded polypropylene sheet/mica-containing polypropylene sheet/expanded polypropylene sheet/mica-containing polypropylene sheet.

The thickness of such a laminate is determined by the target rigidity and weight reduction. The three-layer complex plastic sheet material is usually formed to have a thickness of 1 to 6mm preferably 2 to 6mm. In this invention, the thickness is set at about 2 mm to 6 mm. The maximum flexural load (in accordance with the testing method described later) at this thickness is desired to be set at 9.8 to 49.0 N (1 to 5 kgf). At a thickness less than 1 mm, desired rigidity cannot be maintained easily. Even at a thickness exceeding 6 mm, on the other hand, a special improvement in properties in proportion to a thickness increase cannot be expected. When the maximum flexural load is less than 9.8 N and the sheet has, at one side, a length exceeding 1 m, sagging becomes large, which happens to deteriorate a working efficiency upon attachment. When the maximum flexural load exceeds 49.0 N, on the other hand, a special improvement in properties cannot be recognized. It should be noted that the maximum flexural load as described herein means a value which an automobile interior headliner member is required to have after completion of molding or forming. When an automobile interior headliner member is formed from a three-layer complex plastic sheet material having a structure of mica-containing polypropylene sheet/ expanded polypropylene sheet/mica-containing polypropylene sheet without subjecting it to any special reinforcing processing, the above-described maximum flexural load can be specified as the maximum flexural load which an automobile interior headliner molding or forming member having a three-layer complex plastic sheet material is required to have before molding or forming.

Usually, the three-layer complex plastic material of the present invention is preferably produced by continuously feeding an expanded polypropylene sheet, which is in the rolled form, while rewinding it; extruding a mica-containing polypropylene sheet under a molten state from a T die to stack it over the expanded polypropylene sheet, thereby forming a two-layer sheet; winding it; and stacking a mica-containing polypropylene sheet, which has been extruded under the molten state from a T die, over the two-layer sheet while continuously rewinding it.

The forming or molding member of the present invention is used for an automobile interior ceiling so it is the common practice to cover the outermost layer on the surface side (automobile ceiling on the room side) with an exterior skin material in order to keep the beautiful appearance of the ceiling and to cover the layer on the back side with a back treatment material in order to prevent emission of a rubbing sound due to vibration. Examples of the exterior skin material include nonwoven fabric made of polyester, tricot skin, leather and synthetic leather, while those of the back treatment material include nonwoven fabric available by various preparation processes.

In addition to these assistant layers, another assistant layer can be added to make up for shortage in strength.

In the present invention, a layer of a back treating material is usually formed over the back side of the three-layer complex plastic sheet material, for example, by, upon formation of the three-layer complex plastic sheet material, continuously rolling back a two-layer sheet composed of an expanded polypropylene sheet and mica-containing polypropylene sheet stacked thereover, and stacking thereover another mica-containing polypropylene sheet injected from a T die, while adhering the back treating material to the outside of the another mica-containing polypropylene sheet. The production of a forming or molding member for an automdbile interior headliner is usually completed by the formation of a three-layer complex plastic sheet material or attachment of a back treating material thereto.

A layer of a cladding surface material is efficiently formed over a three-layer complex plastic sheet material simultaneously with the formation of an automobile interior headliner molding or forming member into an automobile headliner. It can be formed, for example, by putting a three-layer complex plastic sheet material free of a cladding surface material (a complex material having a layer of a back treating material formed over a three-layer complex plastic sheet material) or the like in a heating oven, preheating it until the temperature of the surface side of the mica-containing polypropylene sheet on which the cladding surface material is to be laid becomes 170° C. or greater, transferring it to a cooling mold rightly after preheating, laying the cladding surface material over the mica-containing polypropylene sheet, adhering them simultaneously under pressure and molding it under pressure for about 30 seconds (into the shape of an automobile headliner).

In the present invention, it is also possible to obtain a reinforced structure by cutting, into a proper size, a three-layer complex plastic sheet material or an automobile interior headliner molding or forming member having a layer of a back treating material formed over the three-layer complex plastic sheet material; and then partially adhering (temporary adhesion by a tape or the like is preferred), to a strength requiring portion of a mica-containing polypropylene sheet on the side (indoor side) to have a cladding surface material laid thereover, another mica-containing polypropylene sheet. It is preferred, but not particularly limited, to effect reinforcement at either one or both of the outer edge and/or the central region of the complex material from the viewpoints of efficient reinforcement and efficient production.

Since temporary adhesion of the mica containing polypropylene sheet to a part of the automobile interior headliner molding or forming member is carried out under at molten state upon preheating, in the heating oven, followed by pressurization rightly after preheating, it is possible to eliminate, by heating and pressurizing, a step difference at the boundary between thin and thick portions, thereby overcoming the problem in appearance and at the same time attaining a partial increase in its strength.

Although the mica-containing polypropylene sheet to be partially adhered is preferably a material of a similar quality to the mica-containing polypropylene sheet on the surface side of the three-layer complex plastic sheet material from the viewpoint of moldability or formability, the material quality may be a little different between them if there exists no problem in moldability or formability.

Another method for reinforcing a three-layer complex plastic sheet material is to—upon extrusion of a mica-containing polypropylene sheet which constitutes the surface side of the three-layer complex plastic sheet material, that is, the indoor side of an automobile headliner and stacking it over the expanded polypropylene sheet— partially change the lip clearance of the discharge portion (T die) of an extruder, thereby partially changing the thickness of the mica-containing polypropylene sheet on the surface side.

This method also makes it possible to eliminate, by heating and pressurization, a step difference at the boundary between thin and thick portions, thereby overcoming the problem in appearance and at the same time attaining a partial heightening in strength.

A portion to be thickened by partial adhesion of the mica-containing polypropylene sheet is, as described above, preferably at least one of the outer edge and/or central portion of the three-layer complex plastic sheet material. Described specifically, it is possible to thicken the slender central region extending along the extruding direction of the resin of the three-layer complex plastic sheet material or the slender regions extending on both sides extending along the extruding direction of the resin. Alternatively, both can be thickened. It is also possible to thicken the slender central region extending along a direction vertical to the, extruding direction of the resin or the slender regions extending on both sides extending along the direction vertical to the extruding direction of the resin. Alternatively, both can be thickened.

Although no particular limitation is imposed on the width of the portion (slender region) of the mica-containing polypropylene sheet to be thickened by partial adhesion, 100 to 400 mm is preferred, with 200 to 300 mm being more preferred. When the reinforced portion is too narrow, reinforcing effects are not sufficient. When the reinforced portion is too wide, on the other hand, thickening seems to cover the whole area, resulting in lowering in weight reducing effects and cost saving effects of the member. Although no particular limitation is imposed on the thickness of the partial adhesion, about 100 to 300 $\mu$m is preferred. This reinforcing thickness is similar to that of the mica-containing polypropylene sheet on the surface side of the three-layer complex plastic sheet material. Too thick partial adhesion tends to deteriorate the appearance, because the step difference at the reinforced portion does not form a dull curve even by molding or forming under heat and pressure. Too thin partial adhesion on the other hand does not bring about sufficient reinforcing effects. Thickness outside the above-described range is therefore not preferred.

In the present invention, the reinforced portion (the portion to which the mica-containing polypropylene sheet has been partially, adhered or portion obtained by extruding the mica-containing polypropylene sheet to be thick) is not cured because it is made of a thermoplastic resin so that subsequent molding or forming can be conducted more readily.

In the present invention, when a producing order is taken into consideration, it is preferred to dispose a reinforcing portion on the surface side of the three-layer complex plastic sheet material (indoor side of an automobile headliner material) because of the easy attachment of a back treating material. If it is not taken into consideration, this reinforcing portion can be alternatively formed on the back side (a side opposite to the indoor side of the automobile headliner) of the three-layer complex plastic sheet material.

In the present invention, it is also possible to cut, into a proper size, the three-layer complex plastic sheet material or the automobile interior headliner molding or forming member having a layer of a back treating material formed over the complex material, partially press the layer of the mica-containing polypropylene sheet constituting the back side (a side opposite to the indoor side) of the headliner material to have a ruggedness, and thereby improve the rigidity in the concave or convex direction. In this case, only the back side can be partially pressed by using a flat press plate for the surface side (indoor side) of the headliner material and a rugged press plate for a part of the back side. By pressing only the back side, beautiful appearance on the surface side can be maintained. Since there exist uneven portions such as room lamp on the headliner of the automobile, not the whole but a widely flat portion is preferred to be imparted with ruggedness. Moreover, disposal of concave grooves (convex crests) along the front and rear directions of the automobile headliner is preferred from the viewpoint of rigidity.

In the present invention, deflection (sagging) at high temperatures can be prevented by cutting, into a proper size, an automobile interior headliner molding or forming member having a three-layer complex plastic sheet material, and then adhering a resin laminate paper to the outside of the back-side-constituting mica-containing polypropylene sheet, thereby making use of the property of paper which does not soften at high temperatures different from a resin.

Any paper having at least one side thereof, a resin laminated can be used, but craft paper or the like having excellent tensile strength is preferred. As the resin to be laminated, polyolefin resins such as polypropylene and polyethylene are preferred, because it is adhered under molten state to the mica-containing polypropylene sheet or back treating material adhered thereto. Specific examples include combination of craft paper in 50 $\mu$m thickness and polyethylene sheet in 20 $\mu$m thickness and combination of corrugating medium of 120 g/m$^2$ and polyethylene sheet of 20 $\mu$m thick.

This resin laminate paper can be adhered to the back side of the automobile interior headliner molding or forming member having a three-layer complex plastic sheet material by setting the resin laminate paper in a mold in advance upon molding into a shape of an automobile headliner or by temporarily adhering it to the back side of the molding or forming member. In the former method, upon molding or forming the automobile interior headliner molding or forming material, which has been cut into a proper size, into a shape of an automobile headliner, the resin is molten by heat upon molding or forming and adhered, under a molten state, to the automobile interior headliner molding or forming member having a three-layer complex plastic sheet material. In the latter method, the end portion of the resin laminate paper is temporarily adhered to the back side of the automobile interior headliner molding or forming material, which has been cut into a proper size; and the resin is molten by heat under molding or forming, whereby the resin laminate paper is adhered to the automobile interior headliner molding or forming member having a three-layer complex plastic sheet material.

EXAMPLES

Examples will next be described. The numerals relating to mixing and concentration are those based on the weight of the solid content or effective ingredient.

Measurement of Stretchability

Automobile interior headliner molding or forming materials were obtained in accordance with the below-described examples, respectively. After forming each of the laminate samples of about 300 mm square, which had been obtained from the members, under pressure into a flat shape, it was allowed to stand in an atmosphere of 20° C. and 65% RH for 48 hours. On one side of the sample, marks were made at intervals of 200 mm and the initial dimension between two adjacent marks was measured. The sample was then put into a hot air drier set at 90° C. After 8 hours, the size of the sample just taken out from the drier was measured. The changing ratio of the size from the initial size was calculated.

Measurement of the Maximum Flexural Load and Flexural Modulus Gradient

A laminate obtained in a similar manner to that employed for the above-described measurement was cut into a test piece of 50 mm×150 mm. With the surface side down, a load was applied at a rate of 50 mm/min to the center of the test piece having a span length of 100 mm freely supported at both ends and a line showing the relationship between the load and, deflection amount at the center was obtained. The load upon rupture of the material was designated as the maximum flexural load. From the distortion amount and flexural load on a straight line of the measurement chart line in the initial stage of pressurization, a flexural load per mm of the distortion amount was calculated, which was designated as a flexural modulus gradient.

Measurement of Heat-Resistant Cantilever Gravity Drawdown

A laminate obtained in a similar manner to that employed for the above-described measurement was cut into a test piece of 50 mm×250 mm. With the surface side down, the test piece was set (set with one-side rigidly supported) at a grip margin of 50 mm and span length of 200 mm. It was allowed to stand for 4 hours under the circumstance of 90° C. and the initial value at the end of the test piece and a change in deflection after the test piece was allowed to stand under the test circumstance were measured.

Examples will next be described specifically.

EXAMPLE 1

Figure 1:
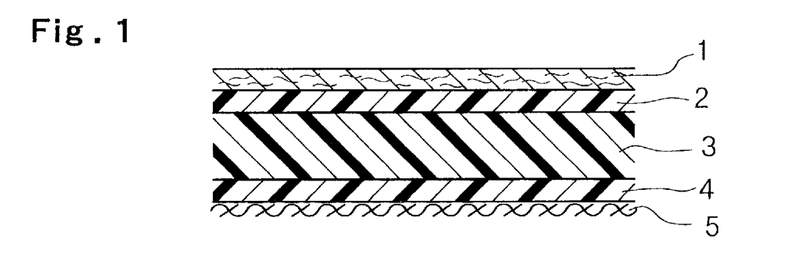
FIG. 1 illustrates a layer constitution of an automobile interior headliner member in Example 1 of the present invention.
Figure 6:
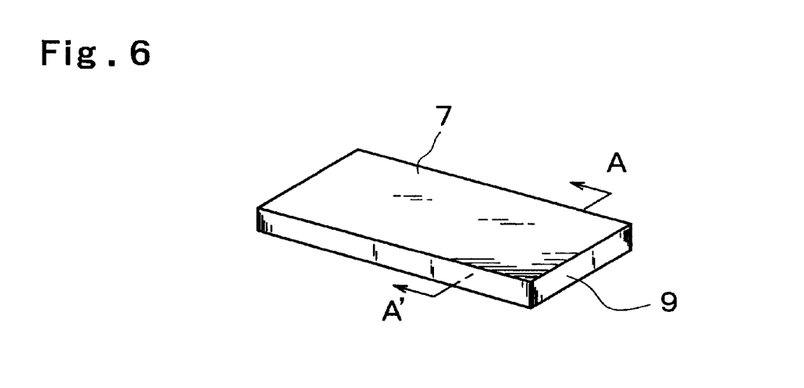
FIG. 6 is a perspective view illustrating the automobile interior headliner molding or forming member in Example 1 of the present invention.

Phlogopite-containing pellets were obtained by kneading, under a molten state, pellets of a polypropylene resin having a melt flow rate (in accordance with Method B of JIS-K-7210) of 25 g/10 min as measured at a testing temperature of 230° C. under a testing load of 21.18 N with 20 wt. % of phlogopite having a particle size of 40 $\mu$m and an aspect ratio of 10 and 0.1 wt. % of a silane coupling agent. From a T die having an extrusion width of 1500 mm, the resulting pellets were melt extruded into phlogopite-containing polypropylene resin 2 to give a thickness of 150 $\mu$m. The resulting resin was continuously stacked over atmospherically expanded and crosslinked polypropylene sheet 3—having a thickness of 3 mm and an expansion ratio of 25—which had been delivered at a rate of 28 m/min, whereby a two-layer complex plastic sheet material was obtained. While delivering the two-layer complex plastic sheet material, phlogopite-containing polypropylene resin 4 was extruded from a T die having an extrusion width of 1500 mm to give a thickness of 150 $\mu$m and stacked over the back surface of atmospherically expanded and crosslinked polypropylene sheet 3 at 28 m/min. At the same time, 15 g/m$^2$ of a polyester spun bond nonwoven fabric was adhered as an outer layer of phlogopite-containing polypropylene resin 4 as Back treating material 5, whereby a laminate of the three-layer complex plastic sheet material+back treating material 9 was obtained.

The resulting laminate was cut into a size appropriate for an automobile ceiling, whereby a member for forming or molding an automobile interior ceiling was obtained. Then, a member (a laminate sample of about 300 mm square) corresponding to an automobile interior ceiling member was obtained by preheating the resulting laminate thus obtained (member for forming or molding an automobile interior ceiling) in an oven, laying Cladding surface material 1 made of a polyester nonwoven fabric over the side of Phlogopite-containing polypropylene sheet 2 where no back treating material is laminated and then, pressing them in a cooling mold.

FIG. 6 is a perspective view illustrating an automobile interior headliner molding or forming member in this example, while FIG. 1 is a view illustrating the layer constitution of an automobile interior headliner member (sample) after completion of the molding or forming. FIG. 1 is a view illustrating the layer constitution corresponding to the cross-section taken along a line A-A'. In the automobile interior headliner molding or forming member, the longitudinal direction is a resin extruding direction and also the front to rear direction of the automobile.

FIGS. 1 to 8 are all illustrated with the indoor side (surface side) of the automobile headliner up.

EXAMPLE 2

Figure 2:
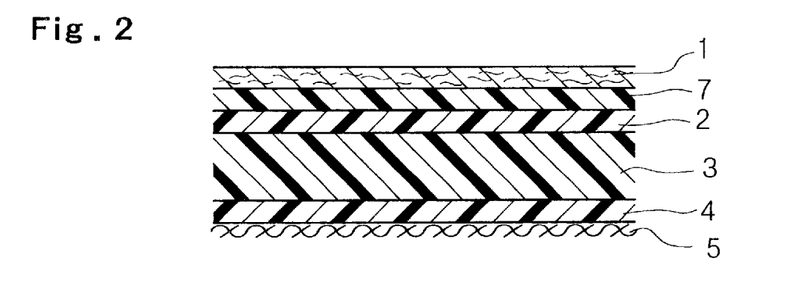
FIG. 2 illustrates a layer constitution of a portion of the automobile interior headliner member of Example 2 of the present invention to which a mica-containing polypropylene sheet has been partially adhered.
Figure 7:
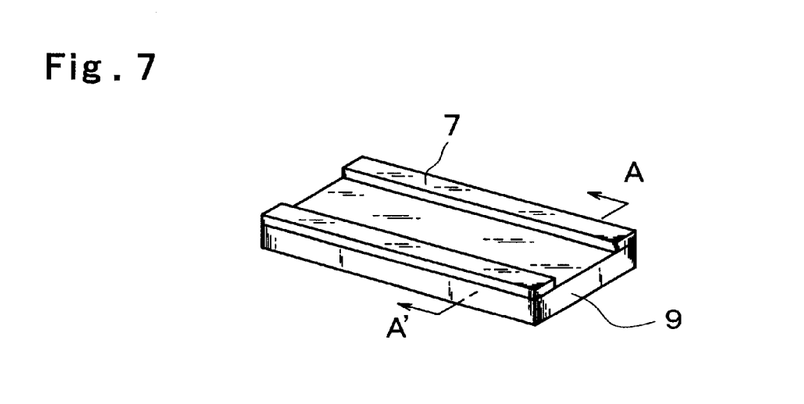
FIG. 7 is a perspective view illustrating the automobile interior headliner molding or forming member in Example 2 of the present invention.

Under similar conditions to Example 1 except that a mica-containing polypropylene sheet 7 (obtained by molding or forming of the phlogopite-containing polypropylene resin 4 as described in Example 1) of 150 $\mu$m in thickness and 300 mm in width was partially adhered (temporarily adhered with a tape) to the surface side (indoor side) of the three-layer plastic composite material at each of the both side-end portions along the extruding direction of the resin of the complex plastic material, whereby an automobile interior headliner molding or forming member was obtained. This laminate (automobile interior headliner molding or forming member) was preheated in a heating oven and then, formed in a cooling mold. At this time, a cladding surface material 1 was stacked over the molded laminate as in Example 1. From the partially adhered and thereby reinforced portions at both sides, a laminate sample (of about 300 mm square) in a similar size to that of Example 1 was obtained.

FIG. 7 is a perspective view of an automobile interior headliner molding or forming member of this Example, while FIG. 2 illustrates the layer constitution of an automobile interior headliner (sample) after completion of the molding. FIG. 2 is view illustrating the layer constitution of the cross-section taken along a line A-A' of FIG. 7 which corresponds to the portion to which the mica-containing polypropylene sheet has been partially adhered.

EXAMPLE 3

Figure 3:
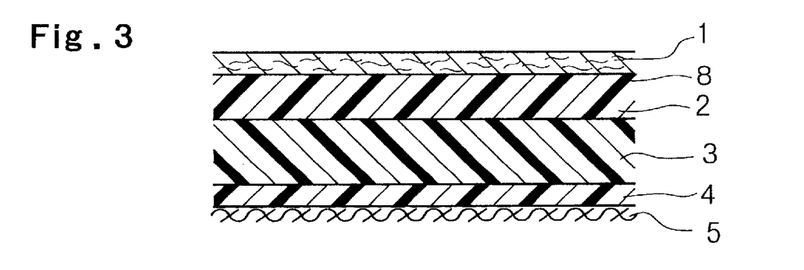
FIG. 3 illustrates a layer constitution of a thick-wall portion of the mica-containing polypropylene sheet of the automobile interior headliner member of Example 3 of the present invention.
Figure 8:
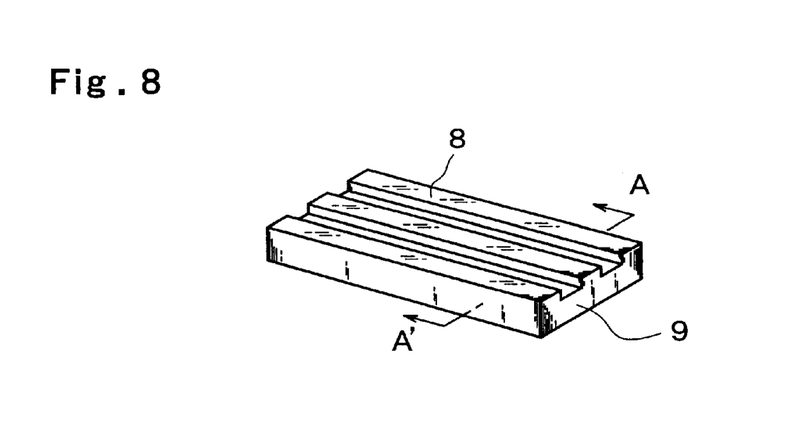
FIG. 8 is a perspective view illustrating the automobile interior headliner molding or forming member in Example 3 of the present invention.

In a similar manner to Example 1 except that upon extruding and laminating a mica-containing polypropylene sheet on the surface side (indoor side) of a three-layer complex plastic material, the lip clearance of a T die was adjusted to 300 $\mu$m at the central portion of 300 mm in width, 300 $\mu$m at each of the side-end portions of 300 mm in width and 150 $\mu$m at another portion, an automobile interior headliner molding or forming member was obtained. This laminate (automobile interior headliner molding or forming member) was preheated in a heating oven and formed in a cooling mold. At this time, a cladding surface material 1 similar to that of Example 1 was stacked and from the thick-wall portion at the central portion, a laminate sample (about 300 mm square) having a similar size to that of Example 1 was obtained.

FIG. 8 is a perspective view illustrating an automobile interior headliner molding or forming member of the present example, while FIG. 3 illustrates the layer constitution of the automobile interior headliner member (sample) after completion of the molding or forming. FIG. 3 is a layer constitution of the cross-section taken along line A-A' of FIG. 8 which corresponds to the thick-wall portion 8 (300 µm) of the mica-containing polypropylene sheet.

Figure 4:
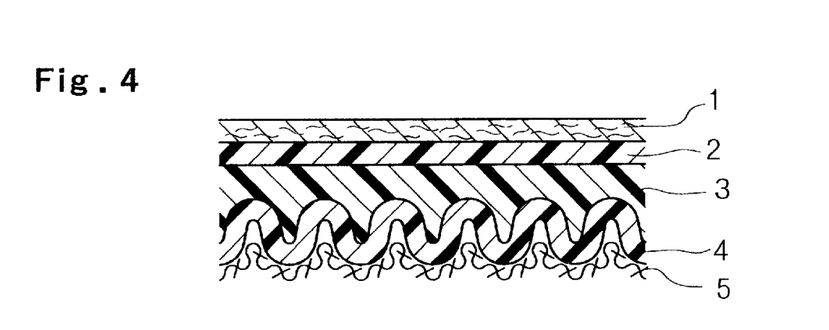
FIG. 4 illustrates a layer constitution of the automobile interior headliner member of Example 4 of the present invention.

An automobile interior headliner molding or forming member obtained in a similar manner to Example 1 was preheated in a heating oven and press-molded in a cooling mold. Upon press molding, a press plate was imparted with ruggedness on the side of the back treating material (on the back side) and the side (surface side) of a cladding surface member was made flat, whereby a laminate sample having a similar size to that of Example 1 was obtained. Upon pressing, the pitch (convex-convex span) was adjusted to about 20 mm, while the height difference between the convex and concave portions was adjusted to about 1.2 mm. The concave groove is preferably disposed along the longitudinal direction of the automobile headliner. At the test for <measurement of maximum flexural load and flexural modulus gradient> or <measurement of heat-resistant cantilever gravity drawdown>, the direction of the groove of the concave portion was made equal to the longitudinal direction (direction of 250 mm) of the test piece (50 mm×250 mm).

FIG. 4 illustrates the layer constitution of the automobile interior headliner member (sample) of this example.

Also in this example, the thin mica-containing polypropylene sheet extruded from a T die was not in the form of a thin sheet, but in the web form.

Test Results

Test results of the complex plastic materials (automobile interior headliner members) obtained in Examples 1 to 5 are shown in Table 1.

At the bending test in Example 4, the span length extending along the concave groove or convex crest was measured and a load was applied to the center of this span length. At the deflection test, the span length extending along the concave groove or convex crest was measured and deflection downwards was measured.

Table 1 shows that the complex plastic materials of Examples 1 to Example 5 had equipped with sufficient properties as an automobile interior headliner member and they have improved rigidity and improved high-temperature deflection resistance by partially reinforcing the mica-containing polypropylene sheet on the surface side of the three-layer complex plastic sheet material, imparting the back side with ruggedness, or adhering a resin laminate paper on the back side.

TABLE 1

| | Weight (g/m$^2$) | Thickness (mm) | Stretchability (%) 90° C., 8 Hr | Rigidity | | |
| --- | --- | --- | --- | --- | --- | --- |
| | | | | Maximum flexural load (N) | Flexural modulus gradient (N/cm) | Cantilever gravity drawdown (mm) |
| Example 1 | 477 | 3.8 | −0.15 | 20 | 44 | −20 |
| Example 2 | 530 | 3.8 | −0.13 | 26 | 73 | −10 |
| Example 3 | 534 | 3.8 | −0.14 | 25 | 75 | −10 |
| Example 4 | 470 | 3.8 | −0.17 | 22 | 46 | −10 |
| Example 5 | 664 | 4.1 | −0.10 | 26 | 74 | −5 |

EXAMPLE 5

Figure 5:
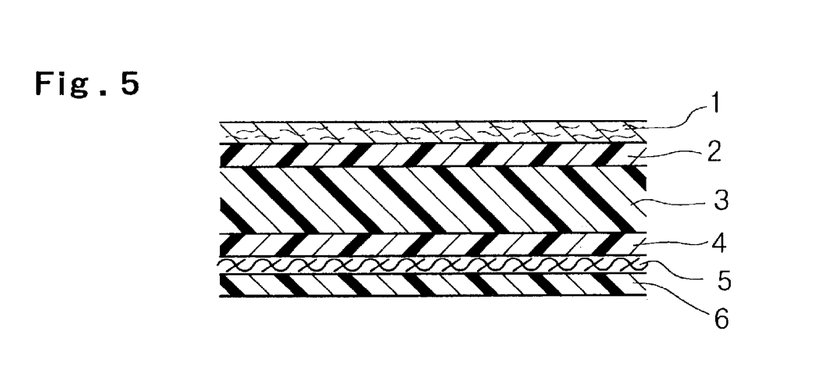
FIG. 5 illustrates a layer constitution of the automobile interior headliner member of Example 5 of the present invention.

An automobile interior headliner molding or forming member similar to that of Example 1 was preheated in a heating oven and press molded in a cooling mold. Upon press molding, a resin laminate paper 6 (a sheet obtained by adhering craft paper of 50 µm thick with polyethylene sheet of 20 µm thick) was set in the cooling mold in advance, followed by press molding, whereby a laminate sample similar in size to that of Example 1 was obtained.

FIG. 5 illustrates the layer constitution of the automobile interior headliner member (sample) of this example.

Comparative Example 1

Under similar conditions to Example 1 except that the mica content in the polypropylene resin was changed to 50 wt. %, treatment was conducted.

In this comparative example 1, the thin mica-containing polypropylene sheet extruded from a T die was not in the form of a thin sheet, but in the web form.

Comparative Example 2

Under similar conditions to Example 1 except that the melt flow rate, at 230° C., of polypropylene resin pellets to be kneaded with mica was changed to 2 g/10 min, treatment was conducted.

An automobile interior headliner molding or forming member or an automobile interior headliner member obtained using the molding or forming member has sufficient rigidity, and excellent size stability and deflection resistance at high temperatures, and good moldability or formability.

In particular, a three-layer complex plastic sheet material having a mica-containing polypropylene sheet formed therein is suited to extrusion of the mica-containing polypropylene sheet over each of both sides of the expanded polypropylene sheet and lamination of them into a relatively wide product at a high rate and it has excellent moldability or formability.

By partially adhering a mica-containing polypropylene sheet to a site of a three-layer complex plastic sheet material which must be reinforced particularly or by partially thickening the mica-containing polypropylene sheet upon its extrusion and lamination, not only rigidity but also high-temperature deflection resistance of the three-layer structured material can be improved.

In particular, since this method does not need the reinforcement all over the headliner material, a weight reduction can be attained, leading to a reduction in both a cost and weight of the automobile body compared with the conventionally known method for thickening the whole headliner material for rigidity improvement.

Rigidity can be improved and moreover, large effects for preventing sagging at high temperatures can be brought about by imparting the back side of the headliner material with ruggedness (bead) upon its formation.

Rigidity can also be improved and moreover, large effects for preventing sagging at high temperatures can be brought about by disposing a layer of a resin laminate paper on the back side.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope of the invention as defined by the appended claims.

What is claimed is:

1. An automobile interior headliner molding or forming member comprising a three-layer complex plastic sheet material formed of an expanded polypropylene sheet and mica-containing polypropylene sheets stacked on both sides of said expanded polypropylene sheet, said three-layer complex plastic sheet material is obtained by kneading mica having a particle size of 10 to 100 μm and a polypropylene resin having a melt flow rate of 3 to 40 g/10 min as measured at a testing temperature of 230° C. under a test load of 21.18 N, forming the resulting mica-containing resin having a mica content of 15 to 40 wt. % into a mica-containing polypropylene sheet having a thickness of 100 to 300 μm and then stacking the mica-containing polypropylene sheet over each of the both sides of the expanded polypropylene sheet having an expansion ratio of 5 to 50 times and a thickness of 2 to 6 mm.

2. An automobile interior headliner molding or forming member according to claim 1, wherein on a surface of the mica-containing polypropylene sheet constituting a surface side of the three-layer complex plastic sheet material, that is, the indoor side of the automobile headliner, a reinforcing portion is partially formed using the mica-containing polypropylene sheet.

3. An automobile interior headliner molding or forming member according to claim 1, wherein on a surface side of the three-layer complex plastic sheet material, that is, the surface of the mica-containing polypropylene sheet constituting the indoor side of the automobile headliner, a reinforcing portion is partially formed by adhering thereto another mica-containing polypropylene sheet similar in material quality to said mica-containing polypropylene sheet.

4. An automobile interior headliner molding or forming member according to claim 2, wherein upon extruding said mica-containing polypropylene sheet which will constitute the surface side of the three-layer complex plastic sheet material, that is, the indoor side of the automobile headliner and then stacking the extruded sheet over the expanded polypropylene sheet one after another, said reinforcing portion has been formed thick on the surface side of the mica-containing polypropylene sheet by partially changing a lip clearance of the discharging portion of an extruder.

5. An automobile interior headliner molding or forming member according to claim 3, wherein said three-layer complex plastic sheet material comprises outer edges and a central portion, and said reinforcing portion of the mica-containing polypropylene sheet constituting the surface side of the three-layer complex plastic sheet material, that is, the indoor side of the automobile headliner, is disposed at least along one outer edge and along said central portion.

6. An automobile interior headliner molding or forming member according to claim 4, wherein said three-layer complex plastic sheet material comprises outer edges and a central portion, and said reinforcing portion of the mica-containing polypropylene sheet constituting the surface side of the three-layer complex plastic sheet material, that is, the indoor side of the automobile headliner, is disposed at least along one outer edge and along said central portion.

7. An automobile interior headliner molding or forming member according to claim 1, wherein said three-layer complex plastic sheet material comprises a back side, and a back treating material is adhered to the back side of the three-layer complex plastic sheet material.

8. An automobile interior headliner molding or forming member according to claim 2, wherein said three-layer complex plastic sheet material comprises a back side, and a back treating material is adhered to the back side of the three-layer complex plastic sheet material.

9. An automobile interior headliner member obtained by molding or forming an automobile interior headliner molding or forming member as claimed in claim 1, wherein the three-layer complex plastic sheet material comprises a back-side-constituting mica-containing polypropylene sheet and a surface-side-constituting mica-containing polypropylene sheet, and the back-side-constituting mica-containing polypropylene sheet of the three-layer complex plastic sheet material partially has a ruggedness and the surface-side-constituting mica-containing polypropylene sheet has a substantially flat surface without ruggedness.

10. An automobile interior headliner member obtained by molding or forming an automobile interior headliner molding or forming member as claimed in claim 2, wherein the three-layer complex plastic sheet material comprises a back-side-constituting mica-containing polypropylene sheet and the surface-side-constituting mica-containing polypropylene sheet, and the back-side-constituting mica-containing polypropylene sheet of the three-layer complex plastic sheet material partially has a ruggedness and the surface-side-constituting mica-containing polypropylene sheet has a substantially flat surface without ruggedness.

11. An automobile interior headliner member formed using an automobile interior headliner molding or forming member as claimed in claim 1, wherein a layer of a resin laminate paper is stacked over a back side of the three-layer complex plastic sheet material.

12. An automobile interior headliner member formed using an automobile interior headliner molding or forming member as claimed in claim 2, wherein a layer of a resin laminate paper is stacked over a back side of the three-layer complex plastic sheet material.

13. An automobile interior headliner molding or forming member as claimed in claim 1, which has a maximum flexural load at break of 9.8 to 49.0 N as measured at a bending test by applying, at a rate of 50 mm/min, a load to a test piece of 50 mm×150 mm at the center of 100 mm span length supported freely at both ends until the member is broken.

14. An automobile interior headliner molding or forming member as claimed in claim 2, which has a maximum flexural load at break of 9.8 to 49.0 N as measured at a bending test by applying, at a rate of 50 mm/min, a load to a test piece of 50 mm×150 mm at the center of 100 mm span length supported freely at both ends until the member is broken.

15. An automobile interior headliner member according to claim 9, wherein the maximum flexural load at break is 9.8 to 49.0 N as measured at a bending test by applying, at a rate of 50 mm/min, a load to a test piece of 50 mm×150 mm at the center of 100 mm span length supported freely at both ends until the member is broken.

16. An automobile interior headliner member according to claim 11, wherein the maximum flexural load at break is 9.8 to 49.0 N as measured at a bending test by applying, at a rate of 50 mm/min, a load to a test piece of 50 mm×150 mm at the center of 100 mm span length supported freely at both ends until the member is broken.

17. An automobile interior headliner molding or forming member according to claim 5, wherein said reinforcing portion of the mica-containing polypropylene sheet constituting the surface side of the three-layer complex plastic sheet material is disposed along each outer edge along said central portion.

18. An automobile interior headliner molding or forming member according to claim 6, wherein said reinforcing portion of the mica-containing polypropylene sheet constituting the surface side of the three-layer complex plastic sheet material is disposed along each outer edge along said central portion.

19. An automobile interior headliner molding or forming member according to claim 1, wherein said expanded polypropylene sheet comprises an atmospherically expanded and crosslinked polypropylene sheet.

20. An automobile interior headliner molding or forming member according to claim 1, wherein the mica is treated with a silane coupling agent.

21. An automobile interior headliner molding or forming member according to claim 1, wherein each mica-containing polypropylene sheet has a silane coupling agent content of 0.1 to 5 wt %.

22. An automobile interior headliner molding or forming member according to claim 7, wherein the back treating material comprises nonwoven fabric.

23. An automobile interior headliner molding or forming member according to claim 8, wherein the back treating material comprises nonwoven fabric.

* * * * *

UNITED STATES PATENT AND TRADEMARK OFFICE
CERTIFICATE OF CORRECTION

PATENT NO. : 6,655,730 B2
DATED : December 2, 2003
INVENTOR(S) : S. Yamagata et al.

It is certified that error appears in the above-identified patent and that said Letters Patent is hereby corrected as shown below:

Title page,
Item [56], References Cited, FOREIGN PATENT DOCUMENTS, the following should be included:
-- 4320636   01/05/95   Germany
   19544451  06/05/97   Germany
   19835612  04/24/96   Germany --

Signed and Sealed this

Thirteenth Day of July, 2004

JON W. DUDAS
*Acting Director of the United States Patent and Trademark Office*